United States Patent
Hasan et al.

(10) Patent No.: US 10,569,777 B2
(45) Date of Patent: Feb. 25, 2020

(54) STABILIZING POWER SUPPLY VOLTAGE TO A LOAD DURING AUTO START

(71) Applicant: GM Global Technology Operations LLC, Detroit, MI (US)

(72) Inventors: S. M. Nayeem Hasan, Novi, MI (US); Timothy Philippart, Orion, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 357 days.

(21) Appl. No.: 15/429,218

(22) Filed: Feb. 10, 2017

(65) Prior Publication Data
US 2018/0229730 A1 Aug. 16, 2018

(51) Int. Cl.
*B60W 30/18* (2012.01)
*F02N 11/08* (2006.01)
*H02J 7/00* (2006.01)
*F02M 51/06* (2006.01)

(52) U.S. Cl.
CPC ... *B60W 30/18018* (2013.01); *F02N 11/0844* (2013.01); *F02N 11/0862* (2013.01); *H02J 7/0063* (2013.01); *B60W 2510/244* (2013.01); *F02M 51/061* (2013.01); *F02N 2250/02* (2013.01); *H02J 2007/0067* (2013.01)

(58) Field of Classification Search
CPC ............ F02N 11/00; B60W 30/00; H02J 7/00
USPC ........................................................ 307/10.6
See application file for complete search history.

(56) References Cited

U.S. PATENT DOCUMENTS

| | | | | |
|---|---|---|---|---|
| 4,723,105 A | * | 2/1988 | Matouka | H02J 7/1423 307/16 |
| 5,617,015 A | * | 4/1997 | Goder | G05F 1/56 323/282 |
| 6,075,299 A | | 6/2000 | Li | |
| 7,176,661 B2 | * | 2/2007 | Kranz | H02M 3/158 323/222 |

(Continued)

OTHER PUBLICATIONS

M. Belloni, E. Bonizzoni, F. Maloberti, On the Design of Single-Inductor Double-Output DC-DC Buck, Boost and Buck-Boost Converters, 15th IEEE Int. Conf. on Electronics, Circuits and Systems, ICECS 2008, St. Julien's, Aug. 31-Sep. 3, 2008, pp. 626-629. (Year: 2008).*

(Continued)

*Primary Examiner* — Rexford N Barnie
*Assistant Examiner* — Joseph N Inge
(74) *Attorney, Agent, or Firm* — Vivacqua Law, PLLC

(57) ABSTRACT

A circuit for compensating for low battery voltage available to power a load includes a power source, an inductor electrically coupled to the power source, a first switch configured to control current flow from the power source to the inductor, and a first diode connecting a first supply rail to the inductor. The circuit also includes a second switch configured to electrically connect the anode of a second diode to the inductor, with the cathode of the second diode connected to a second supply rail. A controller is configured to cycle the first and second switches to achieve a desired voltage values at the first and second supply rails. The second supply rail is electrically connected to the load. The controller is configured to enable the second switch to switch to a closed state only when the voltage at the power source is below a first predetermined threshold voltage.

20 Claims, 2 Drawing Sheets

(56) References Cited

U.S. PATENT DOCUMENTS

| | | | | |
|---|---|---|---|---|
| 7,417,407 | B1* | 8/2008 | Stuart | H02J 7/345 320/103 |
| 8,686,693 | B2* | 4/2014 | Bhowmik | H02J 7/0014 320/152 |
| 9,379,611 | B2 | 6/2016 | Zhao | |
| 2004/0196676 | A1* | 10/2004 | Ishii | H02M 3/33561 363/65 |
| 2016/0118883 | A1* | 4/2016 | Zhao | H02M 3/158 323/311 |

OTHER PUBLICATIONS

D. Kwon and G.A. Rincon-Mora, Single-Inductor Multiple-Output (SIMO) Switching DC-DC Converters, IEEE Transactions on Circuits and Systems II (TCAS II), Invited, vol. 56, No. 8, Aug. 2009.

M. Belloni, E. Bonizzoni, F. Maloberti, On the Design of Single-inductor Double-Output DC-DC Buck, Boost and Buck-Boost Converters, 15th IEEE Int. Cont on Electronics, Circuits and Systems, ICECS 2008, St. Julien's, Aug. 31-Sep. 3, 2008, pp. 626-629.

Belloni, Massimiliano, Bonizzoni, Edoardo and Maloberti, Franco, Single-Inductor Multiple-Output Dc-Dc Converters. Analog Circuit Design: High-speed Clock and Data Recovery. High-performance Amplifiers, Power Management, 2009, 233-253, Springer Netherlands.

* cited by examiner

continued on next lines …

STABILIZING POWER SUPPLY VOLTAGE TO A LOAD DURING AUTO START

The present disclosure relates to a circuit and a method for providing a stable supply voltage to one or more loads during auto start operation of a vehicle.

The introductory description provided herein is for the purpose of generally presenting the context of the disclosure. Work of the presently named inventors, to the extent it is described in this introductory section, as well as aspects of the description that may not otherwise qualify as prior art at the time of filing, are neither expressly nor impliedly admitted as prior art against the present disclosure.

A vehicle may automatically stop its internal combustion engine after coming to a stop. Such a vehicle may also restart its engine before accelerating from the stop. These engine auto stops and auto starts may improve fuel economy by reducing engine idle time and its associated fuel consumption. An auto start may occur when a vehicle operator releases a brake pedal and/or depresses an accelerator pedal. During an auto start of the engine a starter motor powered by the vehicle battery cranks the engine. The electrical load imposed on the battery by the starter motor may lead to an undesirable reduction in the voltage level available from the battery while the engine is cranking, which may necessitate delaying the normal operation of other vehicle loads until the internal combustion engine has restarted.

Thus, while current auto start systems achieve their intended purpose, there is a need for a new and improved system and method for auto start.

SUMMARY

According to several aspects, a circuit for compensating for low battery voltage available to power a load includes a power source, an inductor electrically coupled to the power source, and a first switch configured to control current flow from the power source to the inductor. A first diode connects a first supply rail to the inductor, the first supply rail having a first positive voltage greater than circuit ground. A second switch is configured to electrically connect a second diode between the inductor and a second supply rail having a second positive voltage greater than circuit ground. A controller is configured to cycle the first switch and the second switch to achieve desired voltage values at the first supply rail and the second supply rail. The second supply rail is electrically connected to the load. The controller is configured to enable the second switch to close when the voltage at the power source is below a first predetermined threshold voltage.

In an additional aspect of the present disclosure, the first positive voltage at the first supply rail is greater than the second positive voltage at the second supply rail.

In another aspect of the present disclosure, the circuit further includes a battery having its negative terminal connected to circuit ground and its positive terminal connected to the anode of a third diode, with the cathode of the third diode connected to the load.

In an aspect of the present disclosure, the battery is the power source.

In an aspect of the present disclosure, the circuit further includes a current sensing means configured to sense the current flow to the inductor.

In a further aspect of the present disclosure, the current sensing means is a shunt resistor.

In an aspect of the present disclosure, the direction of current flow in the inductor to generate the first positive voltage is the same as the direction of current flow in the inductor to generate the second positive voltage.

In another aspect of the present disclosure, the controller is configured to maintain the second switch in an open state whenever the voltage at the power source is above a second predetermined threshold voltage.

According to several aspects, a method of controlling a circuit to compensate for low battery voltage available to power a load is disclosed. The circuit used in conjunction with the method includes a power source, an inductor electrically coupled to the power source, and a first switch configured to control current flow from the power source to the inductor. A first diode connects a first supply rail to the inductor, the first supply rail having a first positive voltage greater than circuit ground. A second switch is configured to electrically connect a second diode between the inductor and a second supply rail having a second positive voltage greater than circuit ground. The second supply rail is electrically connected to the load. The method includes the steps of monitoring the voltage at the power source; cycling the first switch to achieve a desired value of the first positive voltage, and cycling the second switch to achieve a desired value of the second positive voltage the second supply rail to the inductor when the voltage at the power source is below a first predetermined threshold voltage.

In another aspect of the present disclosure, the method includes maintaining the second switch in an open state whenever the voltage at the power source is above a second predetermined threshold voltage.

In an aspect of the disclosure, cycling the first switch and the second switch includes maintaining the first switch in a closed state and the second switch in an open state during a first phase, followed by maintaining the first switch in an open state and the second switch in a closed state during a second phase, followed by maintaining the first switch in an open state and the second switch in a open state during a third phase.

In a further aspect of the disclosure, the first switch is maintained in a closed state and the second switch is maintained in an open state during a fourth phase that occurs after the second phase and before the third phase.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
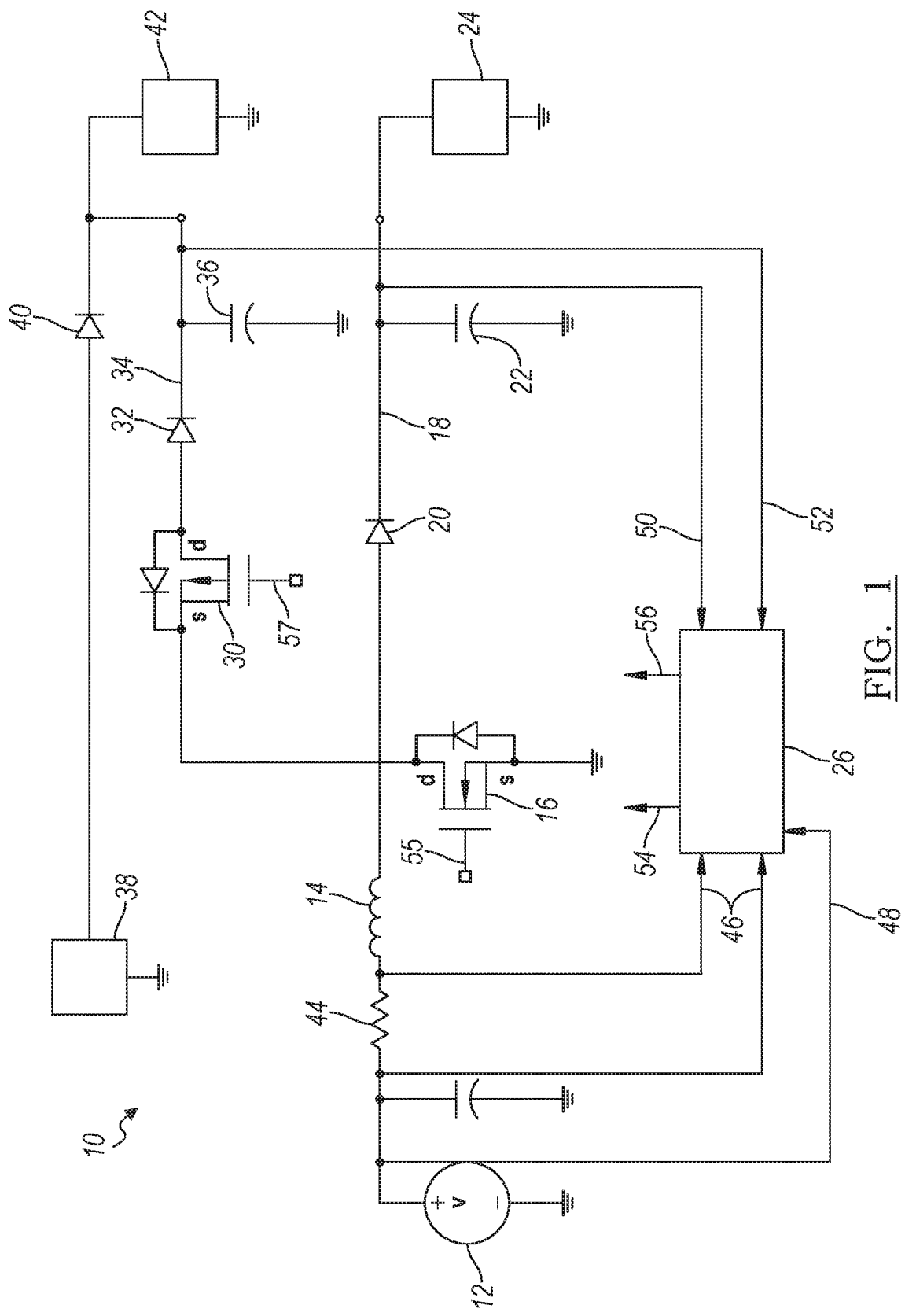
FIG. 1 is a schematic diagram of a circuit according to an exemplary embodiment.

Referring to FIG. 1, a circuit 10 for compensating for low battery voltage available to power a load 42 includes a power source 12, an inductor 14 electrically coupled to the power source 12, and a first switch 16 configured to control current flow from the power source 12 to the inductor 14. A first supply rail 18 is connected to the inductor 14 by a first diode 20. A first output capacitor 22 is connected from the first supply rail 18 to circuit ground.

The power source 12, the inductor 14, the first switch 16, the first diode 20, and the first output capacitor 22 are operable as a boost converter to generate a positive voltage greater than the voltage at the power source 12 on the first supply rail 18. In operation the first switch 16 is cycled between a closed state and an open state. When the first switch 16 is closed, current flows from the power source 12 through the inductor 14 and through the first switch 16, and the inductor 14 stores energy in a magnetic field. When the first switch 16 is opened, the current path through the first switch 16 is interrupted. Current through the inductor 14 will be reduced, and the magnetic field that was previously created when the first switch 16 was closed will be destroyed to maintain the current flow through the inductor 14 toward the first supply rail 18. The polarity of the voltage across the inductor 14 will be reversed so that the voltage seen at the right side of the inductor 14 is greater than the voltage supplied by the power source 12. With a second switch 30 open, the voltage at the right side of the inductor 14 will be high enough to forward bias the first diode 20 and charge the first output capacitor 22 to a voltage higher than the voltage at the power source 12. The voltage at the first supply rail 18 is sensed by a controller 26 that controls the cycling of the first switch 16 to maintain the voltage at the first supply rail 18 at a predetermined desired level.

With continued reference to FIG. 1, the second switch 30 has a first terminal connected to the right hand side of the inductor 14 and a second terminal connected to the anode of a second diode 32. The cathode of the second diode 32 is connected to a second supply rail 34, and the second supply rail 34 is connected to the load 42. A second output capacitor 36 is connected from the second supply rail 34 to circuit ground. The second supply rail 34 has a second positive voltage greater than circuit ground. The controller 26 is configured to control cyclic switching of the second switch 30 based on the voltage at the second supply rail 34. The controller 26 is configured to enable control of the second switch 30 to a closed state only when the first switch 16 is in an open state. The direction of current flow in the inductor 14 to generate the voltage at the first supply rail 18 is the same as the direction of current flow in the inductor 14 to generate the voltage at the second supply rail 34.

The controller 26 controls the first switch 16 and the second switch 30 such that the voltage at the first supply rail 18 is greater than the voltage at the second supply rail 34. In a non-limiting exemplary embodiment, the first supply rail 18 is controlled to a voltage of approximately 65 volts supplied to a high-voltage load 24, and the second supply rail 34 is controlled to a voltage of approximately 12 volts. At these exemplary voltage levels, when the second switch 30 is closed the first diode 20 is reverse biased, preventing current flow through the first diode 20.

With continued reference to FIG. 1, a battery 38 is connected to the anode of a third diode 40. The cathode of the third diode 40 is connected to the load 42. The second supply rail 34 is also connected to the load 42. When the voltage supplied by the battery 38 is sufficiently higher than the voltage at the anode of the second diode 32 the second diode 32 is reverse biased and the third diode 40 is forward biased, and current is supplied to the load 42 by the battery 38. Also, the second diode 32 blocks reverse current flowing from the second output capacitor 36 or the second supply rail 34 when the first switch 16 is closed and the second switch 30 is open, by preventing a body diode within the second switch 30 from becoming forward biased. When the voltage supplied by the battery 38 is sufficiently lower than the voltage at the anode of the second diode 32 the second diode 32 is forward biased and the third diode 40 is reverse biased, and current is supplied to the load 42 by the second supply rail 34.

In an exemplary embodiment, the controller 26 is configured to enable control of the second switch 30 to a closed state when the voltage at the battery 38 is below a first predetermined threshold voltage. The first predetermined threshold voltage may be chosen such that closing of the second switch 30 is enabled when the voltage at the battery 38 falls below a voltage level that is required to operate the load 42.

In an exemplary embodiment, the controller 26 is configured to prevent the second switch 30 from closing when the voltage at the battery 38 is above a second predetermined threshold voltage. The second predetermined threshold voltage may be chosen such that closing of the second switch 30 is disabled when the voltage at the battery 38 is at or above a voltage level that is required to operate the load 42.

In a non-limiting exemplary embodiment, the power source 12 is the battery 38. In an alternative non-limiting exemplary embodiment of the disclosure, the power source 12 is derived from the battery 38 such that there is a direct relationship between the power source voltage and the battery voltage. By way of non-limiting example, the voltage at the power source 12 may be below the voltage at the battery 38 due to ohmic losses in a wiring harness.

In the embodiment shown in FIG. 1 the circuit further includes a shunt resistor 44 configured to sense the current flow to the inductor 14. The voltage across the shunt resistor 44 is proportional to the current through the shunt resistor 44. It will be appreciated that other known current sensing means, including but not limited to a Hall effect device, may be used without departing from the spirit or scope of the disclosure. A signal 46 indicative of current level through the inductor 14 is provided to the controller 26.

With further reference to FIG. 1, the controller 26 receives a power source voltage signal 48, which provides information about the voltage at the battery 38. Additionally, in the embodiment of FIG. 1, the controller 26 receives a first supply rail voltage feedback signal 50 which provides information about the voltage at the first supply rail 18. The controller 26 also receives a second supply rail voltage feedback signal 52 which provides information about the voltage at the second supply rail 34. The controller 26 provides a first control output 54 which provides control of the first switch 16, for example by providing a voltage to the gate 55 of a MOSFET switch configured as the first switch 16 in the exemplary embodiment of FIG. 1. The controller 26 also provides a second control output 56 which provides control of the second switch 30, for example by providing a voltage to the gate 57 of a MOSFET switch configured as the second switch 30 in the exemplary embodiment of FIG. 1.

Figure 2:
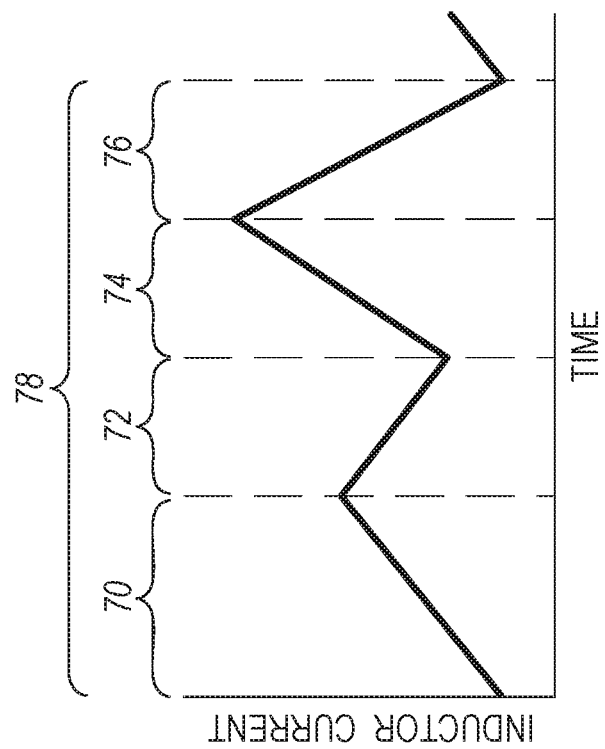
FIG. 2 is an illustration of inductor current vs. time for a first operating mode, according to an exemplary embodiment.

FIG. 2 is an illustration of inductor current vs. time for a first operating mode of a circuit as shown in the embodiment of FIG. 1. Referring to the graph in FIG. 2, during a first time interval 60 the first switch 16 is closed and the second switch 30 is open. During the first time interval 60 the current through the inductor 14 increases, storing energy in a magnetic field associated with the inductor 14. After the first time interval 60 has elapsed, the first switch 16 is opened and the second switch 30 is closed for the second time interval 62. As seen in FIG. 2, the current through the inductor 14 decreases during the second time interval 62 as energy stored in the magnetic field of the inductor 14 is transferred to the second supply rail 34 through the closed second switch 30. During the second time interval 62 the first diode 20 is reverse biased, and no inductor current flows to the first supply rail 18. At the end of the second time interval 62, the second switch 30 is opened. During the third time interval 64, both the first switch 16 and the second switch 30 are open. The first diode 20 is forward biased, and energy stored in the magnetic field of the inductor 14 is transferred to the first supply rail 18 through the first diode 20.

In an exemplary embodiment, the first time interval 60, during which the first switch 16 is closed and the second switch 30 is open, is determined based on the power source voltage feedback signal 48, the inductor current feedback signal 46, the first supply rail voltage feedback signal 50, and the second supply rail voltage feedback signal 52.

In an exemplary embodiment, the second time interval 62, during which the first switch 16 is open and the second switch 30 is closed, is determined based on the second supply rail voltage feedback signal 52, and a total PWM (Pulse Width Modulation) switching period 66.

Figure 3:
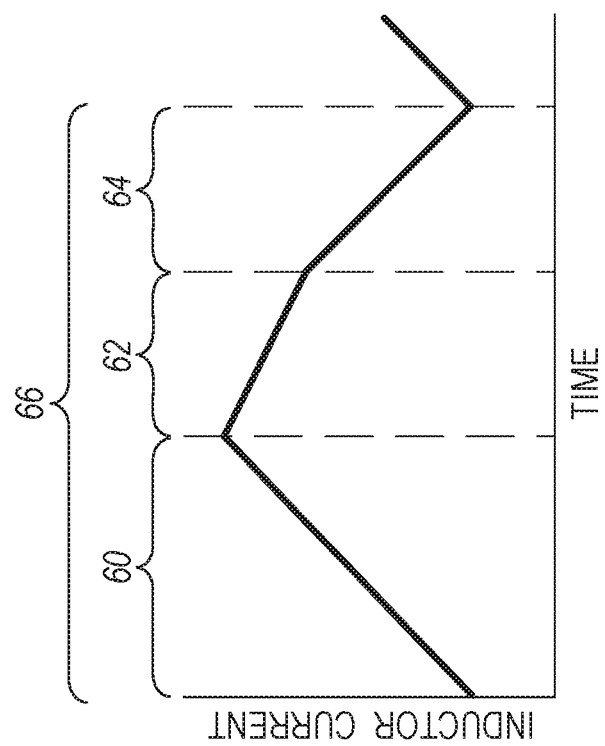
FIG. 3 is an illustration of inductor current vs. time for an alternative operating mode, according to an exemplary embodiment.

FIG. 3 presents an illustration of inductor current vs. time for an alternative operating mode of a circuit such as is shown in the embodiment of FIG. 1. The operating mode depicted in FIG. 3 includes multiple inductor charging phases per cycle, which differs from the operating mode depicted in FIG. 2 in which there was a single inductor charging phase per cycle. Referring to the graph in FIG. 3, during a first time interval 70 the first switch 16 is closed and the second switch 30 is open. During the first time interval 70 the current through the inductor 14 increases, storing energy in a magnetic field associated with the inductor 14. After the first time interval 70 has elapsed, the first switch 16 is opened and the second switch 30 is closed for a second time interval 72. As seen in FIG. 3, the current through the inductor 14 decreases during the second time interval 72 as energy stored in the magnetic field of the inductor 14 is transferred to the second supply rail 34 through the closed second switch 30. During the second time interval 72 the first diode 20 is reverse biased, and no inductor current flows to the first supply rail 18. At the end of the second time interval 72, the second switch 30 is opened and the first switch 16 is closed. During the third time interval 74 the current through the inductor 14 increases, again storing energy in a magnetic field associated with the inductor 14. After the third time interval 74 has elapsed, the first switch 16 is opened. During the fourth time interval 76, both the first switch 16 and the second switch 30 are open. The first diode 20 is forward biased, and energy stored in the magnetic field of the inductor 14 is transferred to the first supply rail 18 through the first diode 20. These four time intervals constitute one PWM switching period 78.

In a non-limiting exemplary application, a motor vehicle includes a circuit as described in the present disclosure. The vehicle has at least one fuel injector configured to be activated by supplying a current to the fuel injector at a voltage that is higher than the nominal voltage supplied by the vehicle battery. The first supply rail 18 of the present disclosure is suitable for providing a fuel injector drive voltage, and the high-voltage load 24 shown in FIG. 1 may represent a fuel injector. In the exemplary application, the load 42 may represent one or more solenoids in an electronically controlled transmission, wherein the solenoids are energized to effect transmission gear selection. In the exemplary application, the supply voltage supplied to operate the transmission solenoids is the nominal vehicle battery voltage (12 volts).

The vehicle in the exemplary application is configured to operate in an auto start mode. During an auto start of the engine a starter motor powered by the vehicle battery cranks the engine. The electrical load imposed on the battery by the starter motor may lead to an undesirable reduction in the voltage level available from the battery while the engine is cranking. During auto start, the battery voltage may drop from its nominal value of 12 volts to a minimum value of 6 volts and may stay below 8 volts for approximately 200 milliseconds. The available battery voltage may be insufficient to allow desired control of the transmission solenoids. As a result, it may be necessary to delay controlling the transmission gear selection until the internal combustion engine has restarted and the voltage at the battery has recovered to its nominal value.

The circuit of FIG. 1 may be used during auto start to stabilize the voltage supply to the transmission solenoid load 42. As a non-limiting example, the first predetermined threshold voltage may be selected to be a voltage level that is below a level encountered when the engine is running but above a minimum level that is encountered during auto start. The second predetermined threshold voltage may be selected to be a voltage level which is sufficiently high to allow proper actuation of the transmission solenoid load 42. The second positive voltage, that is the voltage to which the second supply rail is controlled, may be the nominal battery voltage (12 volts). The circuit and method of the present disclosure offer several advantages. These include enabling control of the transmission gear sooner after an auto start event. Simulation of the circuit shown in FIG. 1 shows that the duration of a reduction in supply voltage to the transmission solenoid load 42 at the beginning of an auto start is on the order of 500 microseconds before the voltage at the second supply rail 34 reaches 12 volts so as to stabilize the supply voltage to the transmission solenoid load 42. This response is sufficient to prevent clutches in the transmission from releasing during the associated low voltage transient at the battery, thereby allowing normal vehicle operation to resume with less delay after auto start.

The circuit topology shown in FIG. 1 allows the second supply rail 34 to maintain the desired voltage to the transmission solenoid load 42 by adding minimal additional hardware (the second switch 30, the second diode 32, and the second output capacitor 36) to the boost converter already in place to provide the first supply rail 18 to the fuel injectors in the exemplary vehicle. Additionally, by providing the second supply rail 34 in a "diode OR" configuration with the battery voltage by way of the second diode 32 and the third diode 40, and by enabling the generation of the voltage at the second supply rail 34 only when the battery voltage is below the second predetermined threshold voltage, the components associated with generating the voltage at the second supply rail 34 only need to operate during a time interval during auto start and not at all times that the vehicle is operating. This aspect may ease thermal management of the components associated with generating the voltage at the second supply rail 34.

As used herein, the term "controller" means any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 26 has a set of control algorithms, including resident software program instructions and calibrations stored in memory and executed to provide one or more desired functions. The algorithms may be executed at regular time intervals during ongoing vehicle operation. Alternatively, algorithms may be executed in response to occurrence of an event.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A circuit for compensating for low battery voltage available to power a load, the circuit comprising:
    a power source;
    an inductor electrically coupled to the power source;
    a first switch configured to control current flow from the power source to the inductor;
    a first diode connecting a first supply rail to the inductor, the first supply rail having a first positive voltage greater than circuit ground;
    a second switch configured to electrically connect an anode of a second diode to the inductor, the cathode of the second diode connected to a second supply rail having a second positive voltage greater than circuit ground;
    a controller configured to cycle the first switch between an open state and a closed state and to cycle the second switch between an open state and a closed state to achieve a desired value of the first positive voltage at the first supply rail and a desired value of the second positive voltage at the second supply rail;
    wherein the second supply rail is electrically connected to the load;
    wherein the controller is configured to enable the second switch to switch to a closed state only when the voltage at the power source is below a first predetermined threshold voltage.

2. The circuit of claim 1, wherein the first positive voltage is greater than the second positive voltage.

3. The circuit of claim 1, further including a battery having its negative terminal connected to circuit ground and its positive terminal connected to the anode of a third diode, wherein the cathode of the third diode is connected to the load.

4. The circuit of claim 3, wherein the battery is the power source.

5. The circuit of claim 1, further including a current sensing means configured to sense the current flow to the inductor.

6. The circuit of claim 5, wherein the current sensing means is a shunt resistor.

7. The circuit of claim 1, wherein the direction of current flow in the inductor to generate the first positive voltage is the same as the direction of current flow in the inductor to generate the second positive voltage.

8. The circuit of claim 1, wherein the controller is configured to maintain the second switch in an open state whenever the voltage at the power source is above a second predetermined threshold voltage.

9. The circuit of claim 8, wherein the second predetermined threshold voltage is equal to the first predetermined threshold voltage.

10. The circuit of claim 8, wherein the second predetermined threshold voltage is greater than the first predetermined threshold voltage.

11. The circuit of claim 1, wherein the controller is configured to receive a power source voltage feedback signal, an inductor current feedback signal, a first supply rail voltage feedback signal, and a second supply rail voltage feedback signal.

12. A method of controlling a circuit to compensate for low battery voltage available to power a load, the circuit comprising:
    a power source;
    an inductor electrically coupled to the power source;
    a first switch configured to control current flow from the power source to the inductor;
    a first diode connecting a first supply rail to the inductor, the first supply rail having a first positive voltage greater than circuit ground;
    a second switch configured to electrically connect an anode of a second diode to the inductor, the cathode of the second diode connected to a second supply rail having a second positive voltage greater than circuit ground;
    wherein the second supply rail is electrically connected to the load;
    the method comprising the steps of:
    monitoring the voltage at the power source;
    cycling the first switch between an open state and a closed state to achieve a desired value of the first positive voltage; and
    cycling the second switch between an open state and a closed state to achieve a desired value of the second positive voltage when the voltage at the power source is below a first predetermined threshold voltage.

13. The method of claim 12, further comprising the step of maintaining the second switch in an open state whenever the voltage at the power source is above a second predetermined threshold voltage.

14. The method of claim 12, wherein the steps of cycling the first switch and cycling the second switch comprise:
    maintaining the first switch in a closed state and maintaining the second switch in an open state over the entirety of a first phase that lasts for a first time duration, followed by
    maintaining the first switch in an open state and maintaining the second switch in a closed state over the entirety of a second phase that lasts for a second time duration, followed by
    maintaining the first switch in an open state and maintaining the second switch in an open state over the entirety of a third phase that lasts for a third time duration.

15. The method of claim 14, further comprising the steps of:
    maintaining the first switch in a closed state over the entirety of a fourth phase that lasts for a fourth time duration, and
    maintaining the second switch in an open state over the entirety of the fourth phase;
    wherein the fourth phase occurs after the second phase and before the third phase.

16. The method of claim 14, further comprising the steps of:
- receiving a power source voltage feedback signal, an inductor current feedback signal, a first supply rail voltage feedback signal, and a second supply rail voltage feedback signal, and
- determining the first time duration based on the power source voltage feedback signal, the inductor current feedback signal, the first supply rail voltage feedback signal, and the second supply rail voltage feedback signal.

17. The method of claim 16, further comprising the step of determining the second time duration based on the second supply rail voltage feedback signal, and PWM switching period.

18. A vehicle comprising:
- at least one electrically actuated transmission solenoid;
- at least one electrically actuated fuel injector;
- a battery; and
- a circuit comprising:
- an inductor electrically coupled to the battery;
- a first switch configured to control current flow from the battery to the inductor;
- a first diode connecting a first supply rail to the inductor, the first supply rail having a first positive voltage greater than circuit ground; the at least one electrically actuated fuel injector configured to receive power from the first positive supply rail;
- a second switch configured to electrically connect an anode of a second diode to the inductor, the cathode of the second diode connected to a second supply rail having a second positive voltage greater than circuit ground; the at least one electrically actuated transmission solenoid configured to receive power from the second supply rail when the second diode is forward biased; and
- a controller configured to cycle the first switch between an open state and a closed state and to cycle the second switch between an open state and a closed state to achieve a desired value of the first positive voltage at the first supply rail and a desired value of the second positive voltage at the second supply rail;
- wherein the controller is configured to enable the second switch to switch to a closed state only when the voltage at the battery is below a first predetermined threshold voltage.

19. The vehicle of claim 18 wherein the at least one electrically actuated transmission solenoid is configured to receive power from the battery when a third diode connected between the battery and the at least one electrically actuated transmission solenoid is forward biased.

20. The vehicle of claim 18 wherein the first positive voltage is greater than the second positive voltage.

* * * * *